(12) United States Patent
Fouan

(10) Patent No.: US 6,622,424 B1
(45) Date of Patent: Sep. 23, 2003

(54) GROUND-COVER, METHOD AND DEVICE FOR MAKING SAME

(76) Inventor: René-Antoine Fouan, 107, avenue Maurice Chevalier, - 06150 Cannes la Bocca (FR)

(*) Notice: Subject to any disclaimer, the term of this patent is extended or adjusted under 35 U.S.C. 154(b) by 0 days.

(21) Appl. No.: 09/857,048

(22) PCT Filed: Oct. 12, 1999

(86) PCT No.: PCT/FR99/02466
§ 371 (c)(1),
(2), (4) Date: Jul. 10, 2001

(87) PCT Pub. No.: WO00/32030
PCT Pub. Date: Jun. 8, 2000

(30) Foreign Application Priority Data

Dec. 3, 1998 (FR) .............................................. 98 15739
Dec. 3, 1998 (FR) .............................................. 98 15738

(51) Int. Cl.[7] ................................................. A01G 7/00
(52) U.S. Cl. ............................................................ 47/9
(58) Field of Search ........................... 47/31, 9; 111/130; 264/115

(56) References Cited

U.S. PATENT DOCUMENTS

| 2,749,964 A | * | 6/1956 | Manning ..................... 111/130 |
| 5,207,826 A | * | 5/1993 | Westland et al. ......... 106/162.5 |
| 5,556,033 A | * | 9/1996 | Nachtman ..................... 239/10 |
| 6,197,141 B1 | * | 3/2001 | Madsen ....................... 156/167 |

* cited by examiner

Primary Examiner—Charles T. Jordan
Assistant Examiner—Francis T. Palo
(74) Attorney, Agent, or Firm—Larson & Taylor, PLC

(57) ABSTRACT

A ground-cover for protecting the ground and crops growing thereon and a method for making the ground-cover is provided. The ground-cover is formed by an opaque layer matching the shape of the ground, comprising natural, vegetable or animal fibers, opaque to light, optionally with at least an opacifier, and a biodegradable binder with an aqueous base to agglomerate the fibers and the opacifier.

19 Claims, 2 Drawing Sheets

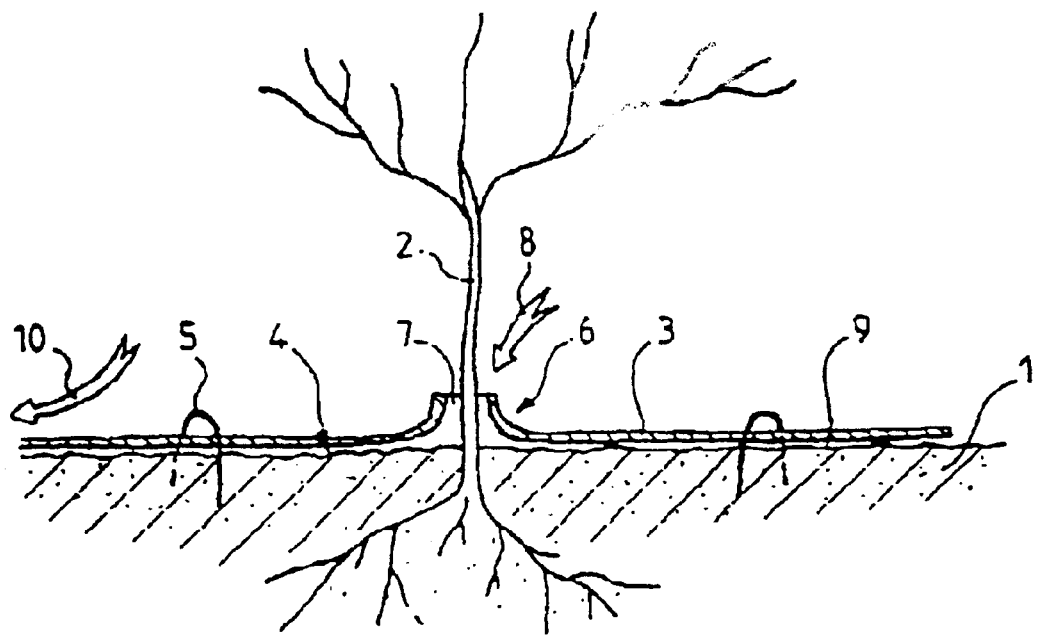
PRIOR ART    FIG. 1
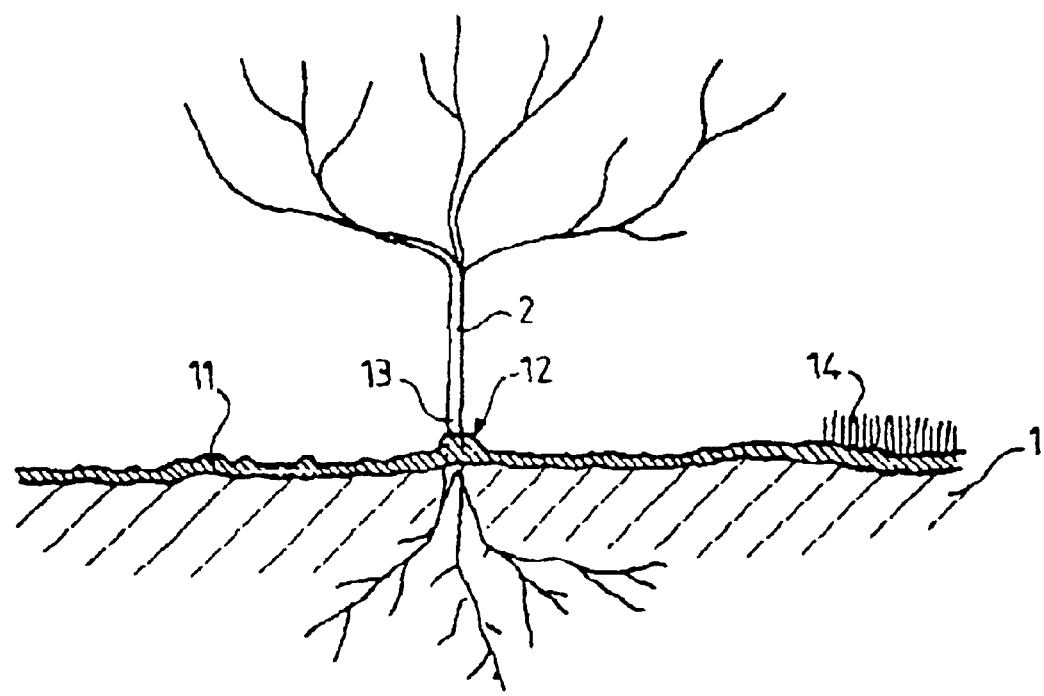
FIG. 2

GROUND-COVER, METHOD AND DEVICE FOR MAKING SAME

The present invention relates to a ground cover for protecting land and the crops which it contains.

It also relates to a method and to a device for making such a ground cover.

It finds a particularly important although nonexclusive application in the field of protection of mellowed ground in the open air, comprising crops, for example of the type including ground situated on the side of motorways or in the urban landscaped domain.

Such ground is indeed subject to the appearance of weeds which then require repetitive and expensive weed control which is not easy to carry out in the immediate vicinity of crops.

Likewise, it may prove necessary to protect such ground and the roots of the crops which it contains from heat, cold and/or risks of gullying in the case of rain.

Several techniques for protecting the ground or land containing crops are already known.

The first technique is to place biodegradable ground bark, for example of pine, at the foot of the crops.

This technique does not make it possible to ensure complete covering of the ground in a prolonged manner, it being possible for the barks bark to be displaced, for example by an animal or by the wind. They require, furthermore, provision to be made for large quantities in order to be effective as the barks bark cannot be joined.

Another disadvantage of this technique also results from the need for spreading which is slow and manual.

Another very old technique consists in placing straw around the crops. This technique, called mulching, makes it possible to use a biodegradable material which makes it possible to enrich the ground.

It is however unaesthetic and has the same types of disadvantage as those described above, it being possible for the straw to fly off easily and/or to be displaced by animals.

A more recent technique consists in placing bands of plastic material which is dark in color, green or black, between the crops.

This technique again also has disadvantages.

The placing indeed requires operations for cutting the plastic material and for placing around particularly complicated crops if the crops are not aligned. Moreover, the multiple bands and pieces of plastic material require being fixed to the ground, for example by means of hooks or picks planted in the soil, which is an additional operation often leading to tearing of the material.

The bands of plastic material are not biodegradable and are therefore harmful to the environment. They can be raised by the wind and wild seeds can germinate in the interstices. They do not, or hardly, allow rainwater running at their surface to penetrate into the ground, which can cause flooding and above all prevent the ground from receiving rainwater.

Finally, in hot regions, the plastic film which is dark in color causes heating of the ground by solar radiation, which is harmful to it.

Another known technique consists in unrolling on the ground rolls comprising a top covering, to improve esthetics which is solidly attached to a retaining support consisting of a plastic film.

Such a technique also has disadvantages. The use of rolls indeed requires tedious cuttings resulting in loss of material, uses connections which are not very leaktight at the base of the crops and requires numerous attachments in the ground, for example metal hooks, which is expensive.

Such rolls also offer, like the plastic bands, entry of wind at the junctions between the rolls, the plastic films accelerating moreover the flow of water in times of a heavy rainfall, which here again causes waterlogging and poor humidification of the ground.

The present invention aims to provide a ground cover, a method and a device for making such a ground cover, which respond better than those previously known to the requirements for practical use, in particular in that it provides an easily biodegradable, continuous ground cover opaque to light, which avoids or considerably limits the germination and the development of weeds.

The ground cover of the invention is capable of partially absorbing rainwater, to which it is at least partially impermeable, which makes it possible to a maintain the moisture of the ground and to play the role of buffer reservoir in case of a large downpour.

It does not require fitting to the land which it protects over its whole surface with excellent adaptation to the bumps and unevenness while following exactly the contours of the crops, easily, rapidly, autonomously and in a manner which is not very expensive to carry out using a mechanizable continuous method.

With this aim in view, the invention provides in particular a ground cover for protecting land, characterized in that it consists of a layer capable of taking the shape of the land, comprising natural, plant or animal fibers which are opaque to light and/or mixed with at least one agent opacifying in light, and an aqueous-based biodegradable binding product which serves to agglomerate said fibers and said agent.

Advantageously, the natural fibers are short.

The expression short fibers should be understood to mean fibers having an average length of less than the order of 5 cm, for example, of less than 3 cm.

Advantageously, the ground cover is made with components (fibers, binder, opacifying agent) which are all 100% from plants, and therefore completely natural.

The mixture obtained is opaque or substantially opaque to light, that is to say, that it allows the passage of less than 20% of light, indeed less than 10%, indeed less than 5% or even less (completely opaque).

In advantageous embodiments, either of the following arrangements may furthermore be used:
- the fibers are chosen from the group consisting of coconut, sisal, wheat straw, rice straw, corn, kapok, flax, hemp, jute, ramie and cotton fibers, and animal fibers, such as the wool recovered from rags, bovine hair, goat hair or boar hair, the various types of fiber being used alone or in combination;
- the fibers are coconut fibers having an average length of less than the order of 5 cm;
- the binder comprises a product which solidifies rapidly by the action of air. The expression rapidly should be understood to mean a time of less than a few hours at ambient temperature, this being, for example, nevertheless greater than the order of 10 to 15° C.

Advantageously, the setting of the binder is very rapid, that is to say a few minutes, for example if the latter is heated beforehand.

Advantageously, the product solidifiable in air is a product crosslinkable in the cold state. The expression crosslinkable in the cold state should be understood to mean a product which solidifies in the form of chains of molecules at temperatures of less than the order of 35° C., rapidly, for example within a few hours, for example three hours at 20° C. However, the crosslinkable product used may also be hot.
- the product solidifiable in air is natural latex;

the agent opacifying in light consists of pieces of biodegradable long fibers or materials which are opaque to light.

The expression long fibers should be understood to mean fibers of several centimetres, for example on average greater than the order of 6 to 8 cm;

the layer comprises, furthermore, alone or in combination, one or more of the following products: an antifoam, a fireproofing agent, a flame retardant, a herbicidal agent, a natural colorant, an antifungal agent, a fertilizer;

the ground cover comprises, furthermore, plant seeds distributed in at least part of the layer;

the layer comprises, for 100 parts by weight of fibers, between about 40 parts and about 80 parts by weight of binding product;

the binding product comprises a product which solidifies rapidly in air and a filling product, such that for 100 parts by weight of fibers, it comprises between about 20 parts by weight and 50 parts by weight of product which solidifies rapidly and between about 10 parts by weight and about 40 parts by weight of filling product;

The filling product makes it possible to reduce the necessary quantities of product which solidifies, which is always more expensive than the filling product.

the mixture of fibers and opacifying agent is composed, for 100 parts by weight of mixture, of between about 50 and about 75 parts by weight of fibers whose length is between about 1 cm and about 5 cm, and between about 25 and about 50 parts by weight of opacifying agent whose average maximum size is between about 3 mm and about 15 mm.

The invention also provides a method of making a ground cover of the type described above.

It also provides a method of making a ground cover for protecting land, characterized in that an aqueous mixture is formed by mixing water, a binder comprising a product solidifiable in air, a filling product and one or more agents having a specific activity, a mixture of dry natural fibers with or without additional opacifying agent is prepared separately, said mixture of dry fibers is discharged continuously, simultaneously with the spraying of said aqueous mixture, such that a pasty product which is opaque to light is thus formed which spreads over the land to be protected, and then allowed to dry and solidify.

Advantageously, the aqueous mixture is formed by mixing, for 100 parts by weight of water, between about 20 parts by weight and 50 parts by weight of product solidifiable in air and between about 10 parts by weight and about 40 parts by weight of filling product.

Also advantageous, one or more of the following products are added to the aqueous mixture: an antifoam, a fireproofing agent, a flame retardant, a herbicidal agent, a natural colorant, an antifungal agent, a fertilizer.

In an advantageous embodiment, the mixture of dry fibers and of opacifying agent is formed with between about ½ and about ¾ of the mixture composed of fibers whose length is between about 1 cm and about 5 cm, and with between about ¼ and about ½ of the mixture composed of opacifying agent consisting of pieces of material of which the largest size is between about 3 mm and about 15 mm.

Advantageously, seeds are added to the mixture of dry fibers, before discharge.

Also, advantageous, the aqueous mixture is discharged with an average liquid flow rater of the order of 3 to 5 liters per minute and the mixture of dry fibers with an average gaseous flow rate of the order of 30 to 50 liters per minute.

In an advantageous embodiment, a layer is formed which has a thickness of between 50 mm and 3 cm, for example of the order of 1 cm.

The invention also provides a device for making a ground cover of the type described above, advantageously using the method which is also described above.

It also provides a device for making a ground cover for protecting land, characterized in that it comprises at least one tank for preparing an aqueous mixture to prepare a binding product, means for supplying natural fibers and optionally at least one opacifying agent, means for expanding/shredding said natural fibers, means for picking up the expanded fibers by ventilating means for spraying said fibers on the land and means for discharging the aqueous mixture simultaneously with said spraying of fibers, such that a pasty mixture is formed which is opaque to light and suitable for constituting the ground cover after drying and solidification.

Such a device, which allows application by discharging, is not very bulky and can therefore be easily transported for example on the platform of a van, which makes it possible to reach land which is not very accessible.

The mixing of fibers, binding product and, where appropriate, opacifying product occurs immediately at the outlet of the means for discharging and spraying, in the open air, which avoids in particular any blocking of the piping supplying the products.

The invention will be understood more clearly on reading the description which follows of embodiments given by way of non-limiting examples.

The description refers to the drawings accompanying it in which:

FIG. 1 is a sectional view of a ground cover system according to the prior art.

FIG. 2 is a sectional view of the ground cover according to the invention.

Figure 3:
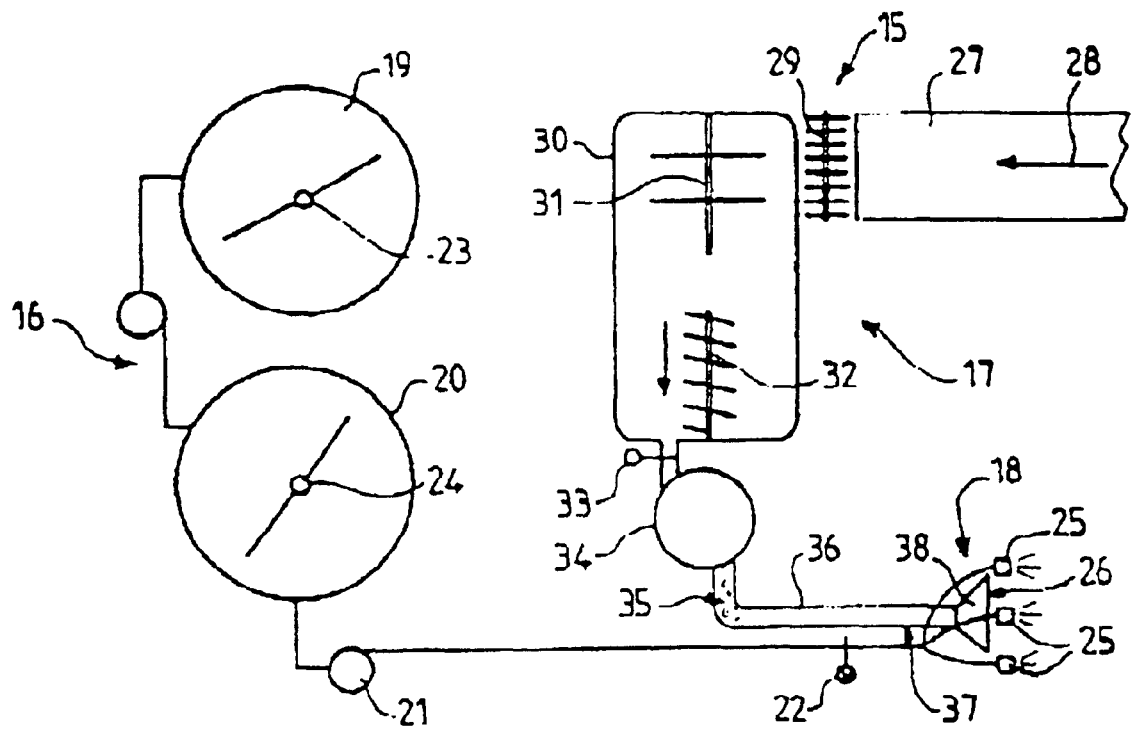
FIG. 3 is a skeleton diagram of one embodiment of a device according to the invention.

FIG. 1 shows land 1 with a crop 2, for example a small shrub. The land is provided with a ground cover 3 according to the most common prior art, consisting of a dark plastic film. The film is fixed to the surface 4 of the ground by metal hooks 5, and roughly takes the shape 6 in the foot of the crop 2, leaving an interstice 7 through which weeds may penetrate (arrow 8).

The ground cover 3 is in fact not joined to the surface 4, leaving a space 9 in many places, which promotes the detachment of the film by the wind. In case of rain, water 10 runs on the surface of the film and cannot penetrate into the ground.

FIG. 2 shows the same land 1 with a crop 2. The land is this time provided with an opaque ground cover 11 according to the invention which perfectly takes the shape of the surface 4 of the ground, leaving no space.

The ground cover can indeed be perfectly joined to the surface of the ground and its bumps since it was spread without a pasty form before its solidification.

Likewise, it perfectly takes the shape in 12 of the foot 13 of the crop 2. Finally, in one embodiment, as seed grains or seeds have been inserted into the ground cover layer at the time of its formation, turf 14 is, for example, obtained which covers the ground cover.

FIG. 3 shows schematically an embodiment of the mobile device 15 for making a ground cover according to the invention.

The device 15 comprises a circuit 16 for preparing and discharging the binding product, or binder, continuously, and a circuit 17 for preparing the natural fibers and the opacifying agent, also continuously.

This circuit 17 is separated from the circuit 16, and physically rejoins the latter at the level of the hose 18 for simultaneously discharging the binder and the fibers.

More precisely, the circuit 16 comprises a first tank 19 for preparing the binder, which supplies a second tank 20, for continuously drawing off the binder by a pump 21 whose capacity can be regulated by the user via a manual regulating knob situated at the level of the nozzle 18.

Electrical devices 23 and 24 are provided for blending the binder. The first preparation tank 19 makes it possible to separate manufacture and supply, which avoids disruption in the supply of the binder which, because of its solidification cannot be prepared too much in advance either.

In the embodiment more particularly described here, the circuit 16 comprises three parallel nozzles 25 for discharging or spraying the product, arranged at the outlet of the hose 18, above the outlet 26 of the circuit 17 for preparing and discharging the fibers, the binder being therefore mixed with the latter at the time of discharging onto the ground.

The nozzles or jets 25 for spraying the binder may of course be in a smaller or larger number, for example one, two or four.

The circuit 17 comprises, for its part, a conveyor belt 27 for bringing bales of fibers previously cut substantially to predetermined sizes, which bales are introduced in 28 and which comprise calibrated pieces of coconut husk of about 5 to 10 mm wide.

The conveyor belt 27 continuously supplies an electric shredding/expanding device 29 which will make it possible to separate the fibers and/or to bring them to the average sizes sought for good mixing with the binder.

The expanding device 29 supplies an intermediate tank 30 provided with a mechanical blending blade 31 which makes it possible to avoid a tunnel effect in the tank 30.

The latter comprises, at the bottom of the tank, an endless screw 32 which supplies, via a valve 33 for closing the tank, and across a knife (not represented) a blowing turbine 34.

The knife makes it possible, where appropriate, to recut the fibers to an average size of a few centimeters, for example of less than the order of 4 cm, which avoids the fibers forming into locks and blocking the ventilator.

The dry fibers are discharged by a tube 36 which ends with a flexible part 37 at the level of the hose which can be manually held by the user, and a nozzle 38 for discharging the fibers and the opacifying agent.

Figure 4:
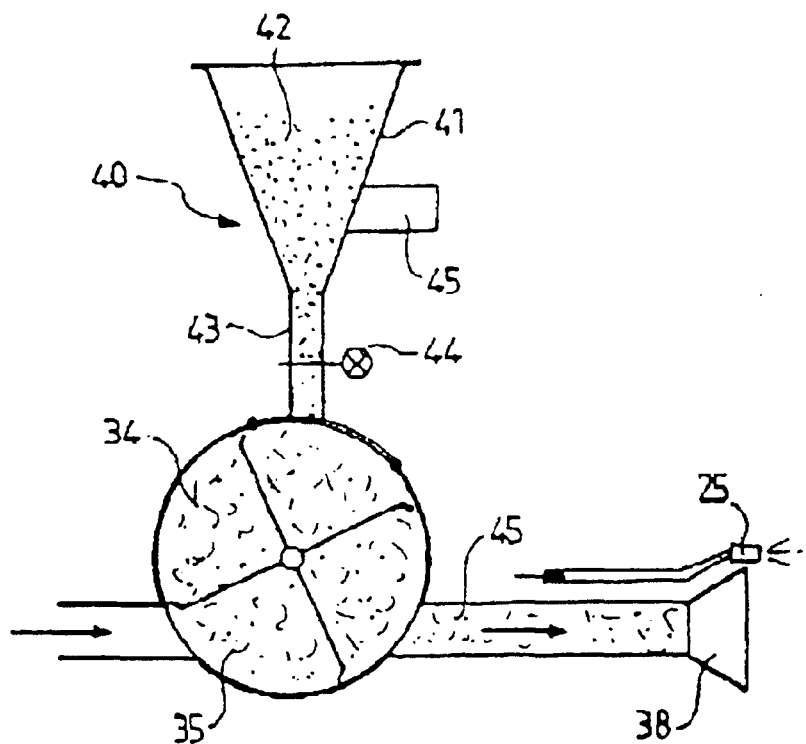
FIG. 4 is a skeleton diagram of an apparatus for supplying with seeds which is used in another embodiment of the invention.

FIG. 4 shows a particular embodiment which allows the ground cover to be continuously supplied with seeds.

The introduction of seeds into the fibrous mixture will allow the production of turf or the introduction of plant seed grains into the ground cover for treated surfaces, which promotes acceleration or stabilization and avoids gullying to a greater extent, for example in the case of an embankment with a sharp slope, such as those of motorways or of the railway.

The fibrous mixture and its natural-latex based binder in the embodiment more particularly described here, indeed constitute an excellent stabilized support for cultivation, allowing germination of seed grains which then root in the ground.

In the remainder of the description the same reference numbers will be used to denote the same components.

FIG. 4 therefore shows a device 40 connected to the turbine 34 supplied with fibers 35. The device 40 comprises a funnel 41 for supplying with seed grains 42 connected to the housing for the blowing turbine 34 via a tube 43 with the knob 44 for regulating the throughput.

An electric vibrator 45 is advantageously provided for ensuring a homogeneous throughput of the seed grains which mix with the fibers in the turbine, and leave in the form of a seed grain/fiber mixture 45.

One example for carrying out the method used according to the invention will now be described with reference to FIG. 3.

The user regularly prepares batches of mixture forming the aqueous-based binding product, in the first tank 19 for example of 1 m$^3$.

The composition is for example the following, for 1 m$^2$ of ground cover whose thickness is of the order of 1.5 cm:

350 g of product crosslinkable in the cold state, consisting of natural latex, 250 g of filling product (chalk, marble powder, and the like) which makes it possible to consume less latex while providing volume, 1000 g of water, a very small quantity (a few grammes) of antifoam, flame retardant, fireproofing agent, herbicidal agent (for the ground cover not intended for sowing), and the like.

Other products for obtaining the binding product solidifiable in air may of course be used, such as synthetic latex or styrene, as long as they possess adequate mechanical qualities of flexibility and resistance to pulling and lixiviation.

Simultaneously, a mixture of natural fibers and opacifying agent is prepared via the circuit 17.

To do this, the conveyor belt 27 is supplied with bales of coconut fibers. The bales pass one by one into the shredding/expanding device 29, producing the short fibers and the opacifying agent.

To do this, the blades and the speed of operation of the shredding/expanding device are adjusted according to the desired sizes, in a manner within the ability of persons skilled in the art.

In the embodiment more particularly described here, coconut fibers are used, for example with the following proportions:

for 1 kg/m$^2$ of fibrous mixture that is about 15 liters:

$^2\!/_3$ of coconut fibers having an average length of 2 to 4 cm, $^1\!/_3$ of coconut husk in pieces of about 5 to 10 mm/m (average radial size).

Such proportions thus make it possible to obtain a ground cover after evaporation of the water and solidification, having a weight of about 1,410 kg/m$^2$.

The above values are given by way of examples, without limitation.

Once the mixtures have been obtained separately, namely the binder on the one hand, the fibers and the opacifying agent on the other, these mixtures continuously supply, via the pump 21 or the ventilator 34, on the one hand the spraying jets 25 and on the other hand the nozzle 38 for discharging dry products.

The flow rate for spraying the binding product, with the nozzles 25, is for example 1.35 liters×3 per minute.

As the turbine for supplying dry fibers and opaque products is for its part at a throughput of the order of 45 liters/minute, this will take of the order of 20 seconds to fit out one m$^2$ of land.

As is evident per se and as also results from above, the present invention is not limited to the embodiments more particularly described. It encompasses on the contrary all the variants and in particular those where other binders and opaque agents are used, those where the opaque agents are supplied separately from the fibers, and/or optionally mixed with the binding product, if they are of the liquid or powder type.

What is claimed is:

1. A ground cover for protecting land, comprising a mixture of natural plant fibers having an average length of less than the order of 5 cm, which are opaque to light and/or mixed with at least one agent opacifying in light, and a binder serving to agglomerate said fibers and said agent where appropriate, wherein the fibers are coconut fibers and/or hemp fibers, said binder being crosslinkable, biodegradable and containing an aqueous base solidifiable in air, said fibers being sprayed onto the ground separately and at the same time as the binder, to form a pasty layer capable of taking the shape of the land and of partially absorbing water to which the pasty layer is at least partially permeable.

2. The ground covering according to claim 1, wherein the fibers are coconut fibers.

3. The ground cover according to claim 1, wherein the binder solidifiable in air is natural latex.

4. The ground cover according to claim 1, wherein the agent opacifying in light consists of pieces of biodegradable long fibers or materials which are opaque to light.

5. The ground cover according to claim 1, wherein the pasty layer, further comprises, alone or in combination, at least one selected from the group consisting of an antifoam, a fireproofing agent, a flame retardant, a herbicidal agent, a natural colorant, an antifungal agent, and a fertilizer.

6. The ground cover according to claim 1, further comprising plant seeds distributed in at least a part of the pasty layer.

7. The ground cover according to claim 1, wherein the pasty layer comprises, for 100 parts by weight of fibers, between about 40 parts and about 80 parts by weight of binder.

8. The ground cover according to claim 7, wherein the binder comprises a product solidifiable in air and a filling product, and in that for 100 parts, by weight of fibers, the binder comprises between about 20 parts by weight and about 50 parts by weight of solidifiable product and between about 10 parts by weight and about 40 parts by weight of filling product.

9. The ground cover according to claim 1, wherein the mixture of fibers and opacifying agent is composed, for 100 parts by weight of mixture, of between about 50 parts and about 75 parts by weight of fibers whose length is between about 1 cm and about 5 cm, and between about 25 parts and about 50 parts by weight of opacifying agent consisting of pieces of material having a larger size of between about 3 mm and about 15 mm.

10. A method of making a ground cover for protecting land, said method comprising the steps of:

forming an aqueous mixture by mixing water, a binder comprising a product solidifiable in air, a filling product and one or more agents having a specific activity, preparing separately a mixture of dry natural fibers with or without additional opacifying agent, discharging said mixture of dry fibers continuously, while spraying simultaneously and separately said aqueous mixture, to form an opaque pasty product spread over the land to be protected, and allowing said opaque pasty product to dry and solidify.

11. The method according to claim 10, wherein the aqueous mixture is formed by mixing, for 100 parts by weight of water, between about 20 parts by weight and 50 parts by weight of product solidifiable in air and between about 10 parts by weight and about 40 parts by weight of filling product.

12. The method according to claim 10, wherein said aqueous mixture further comprises at least one selected from the group consisting of an antifoam, a fireproofing agent, a flame retardant, a herbicidal agent, a natural colorant, an antifungal agent, and a fertilizer.

13. The method according to claim 10, wherein the mixture of dry fibers and of opacifying agent is formed with between about ½ and about ¾ of the mixture composed of fibers whose length is between about 1 cm and about 5 cm, and with between about ¼ and about ½ of the mixture composed of opacifying agent consisting of pieces of material having a maximum size of between about 3 mm and about 15 mm.

14. The method according to claim 10, wherein seeds are added to the mixture of dry fibers, before discharging said mixture of dry fibers.

15. The method according to claim 10, wherein the aqueous mixture is discharged with an average liquid flow rate of the order of 3 to 5 liters per minute and the mixture of dry fibers with an average gaseous flow rate of the order of 30 to 50 liters per minute.

16. The method of making a ground cover according to claim 10, wherein said pasty layer dries and solidifies to form a layer having a thickness of between 50 mm and 3 cm.

17. A device for making a ground cover for protecting land, said device comprising:

at least one tank for preparing an aqueous mixture for a binding product, means for supplying natural fibers, optionally at least one opacifying agent, means for expanding/shredding said natural fibers, means for picking up the expanded fibers by ventilating means for spraying said natural fibers onto the land, and means for discharging the aqueous mixture simultaneously with said spraying of fibers, such that a pasty mixture is formed which is opaque to light and suitable for constituting the ground cover after drying and solidification.

18. The device according to claim 17, wherein the means for discharging the binding product comprise three nozzles arranged in a parallel plane.

19. The device according to claim 17, further comprising means for introducing seeds into the stream of fibers before spraying.

* * * * *